United States Patent
Studer

(10) Patent No.: US 8,616,230 B2
(45) Date of Patent: Dec. 31, 2013

(54) DUAL-ACTING MULTI-ACTUATION MODE GATE VALVE

(75) Inventor: David Studer, Houston, TX (US)

(73) Assignee: Cameron International Corporation, Houston, TX (US)

( * ) Notice: Subject to any disclaimer, the term of this patent is extended or adjusted under 35 U.S.C. 154(b) by 538 days.

(21) Appl. No.: 12/937,540

(22) PCT Filed: Apr. 27, 2009

(86) PCT No.: PCT/US2009/041853
§ 371 (c)(1),
(2), (4) Date: Oct. 12, 2010

(87) PCT Pub. No.: WO2009/154874
PCT Pub. Date: Dec. 23, 2009

(65) Prior Publication Data
US 2011/0056566 A1    Mar. 10, 2011

Related U.S. Application Data

(60) Provisional application No. 61/061,990, filed on Jun. 16, 2008.

(51) Int. Cl.
*F16K 17/40* (2006.01)
(52) U.S. Cl.
USPC .............................. 137/71; 137/460; 137/461
(58) Field of Classification Search
USPC ............... 137/67, 68.16, 68.17, 71, 460, 461, 137/797; 251/337
See application file for complete search history.

(56) References Cited

U.S. PATENT DOCUMENTS

| 2,418,440 | A | * | 4/1947 | White et al. | 137/71 |
| 2,704,551 | A | * | 3/1955 | Ralston | 251/337 |
| 2,765,801 | A | * | 10/1956 | Selim | 137/71 |
| 4,724,857 | A | | 2/1988 | Taylor | |
| 4,907,617 | A | * | 3/1990 | Whalen | 137/71 |
| 5,012,834 | A | * | 5/1991 | Taylor | 137/70 |
| 5,067,511 | A | * | 11/1991 | Taylor | 137/67 |
| 5,103,853 | A | * | 4/1992 | McGushion et al. | 137/71 |
| 5,144,973 | A | * | 9/1992 | Green et al. | 137/71 |

(Continued)

FOREIGN PATENT DOCUMENTS

GB    2220049    12/1989

OTHER PUBLICATIONS

PCT Search Report and Written Opinion of PCT Application No. PCT/US2009/041853 dated Jul. 28, 2009.

*Primary Examiner* — John Rivell
(74) *Attorney, Agent, or Firm* — Fletcher Yoder, P.C.

(57) ABSTRACT

A dual acting multi actuation gate valve is provided that includes a secondary actuation mechanism. The valve may include a body, a shaft, a movable portion disposed within the body and coupled to the shaft, wherein the movable portion is configured to allow fluid flow through the valve when in a first position and to prevent fluid flow through the valve when in a second position. The valve includes an actuator coupled to the shaft, wherein the actuator is configured to move the movable portion between the first position and the second position, a mechanical connection between the actuator and the shaft, wherein the mechanical connection is configured to fail in response to an internal pressure, wherein the failure of the mechanical connection maintains the movable portion in the second position. A method of operation and testing the valve are also provided.

31 Claims, 8 Drawing Sheets

(56) References Cited

U.S. PATENT DOCUMENTS

| | | | | |
|---|---|---|---|---|
| 5,146,942 A | * | 9/1992 | Taylor | 137/67 |
| 5,209,253 A | * | 5/1993 | Taylor | 137/67 |
| 5,297,575 A | * | 3/1994 | Taylor | 137/70 |
| 5,311,898 A | * | 5/1994 | Taylor | 137/67 |
| 5,318,060 A | * | 6/1994 | Taylor | 137/67 |
| 5,433,239 A | * | 7/1995 | Taylor | 137/69 |
| 5,575,306 A | * | 11/1996 | Taylor | 137/70 |
| 5,706,848 A | * | 1/1998 | Taylor | 137/71 |
| 5,810,057 A | * | 9/1998 | Westman | 137/68.19 |
| 5,860,442 A | * | 1/1999 | Taylor | 137/68.11 |
| 6,321,768 B1 | | 11/2001 | Taylor | |
| 6,425,410 B1 | * | 7/2002 | Taylor | 137/70 |
| 6,651,686 B2 | * | 11/2003 | Scantlin et al. | 137/70 |
| 6,799,597 B1 | * | 10/2004 | Taylor | 137/71 |
| 6,880,568 B1 | | 4/2005 | Taylor | |
| 7,124,770 B2 | * | 10/2006 | Schmidt et al. | 137/68.16 |

* cited by examiner

DUAL-ACTING MULTI-ACTUATION MODE GATE VALVE

CROSS-REFERENCE TO RELATED APPLICATIONS

This application claims priority to and benefit of PCT Patent Application No. PCT/US2009/041853, entitled "Dual-Acting Multi-Actuation Mode Gate Valve," filed Apr. 27, 2009, which is herein incorporated by reference in its entirety, and which claims priority to and benefit of U.S. Provisional Patent Application No. 61/061,990, entitled "Dual-Acting Multi-Actuation Mode Gate Valve", filed on Jun. 16, 2008, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, natural resources such as oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Once the natural resource is extracted, it is generally transported to processing locations, such as refineries. The transportation of these resources is accomplished through a system of pipelines, which are controlled through various types of valves located at different points throughout the system.

Such extraction systems may include pipelines or other transportation infrastructure to transport the resource from a source, e.g., a well, to a destination such as further transportation systems or storage facilities. The pipelines or other transportation infrastructure may include pressure control, regulation, and safety devices, which may include valves, actuators, sensors, and electronic control modules. Such devices may be configured to relieve pressure or shut off flow of the resource if a high pressure condition is detected.

One such device or group of devices may be referred to as a high integrity pressure protection system (HIPPS). A HIPPS may be required to meet certain regulatory specifications, such as a minimum risk reduction level, referred to as a Safety Integrity Level (SIL). The HIPPS may be used to shut off fluid flow in response to a high pressure condition so that equipment downstream of the HIPPS is not damaged by the high pressure.

Conventional systems often provide an automatic response to a high pressure condition via a sensor, electronic control module, and an actuator that closes a valve in response to the high pressure condition. If the sensor, electronic control module, or actuator fails, the high pressure in the valve or other forces may force the valve to open. The high pressure fluid may damage equipment downstream of the HIPPS that is not capable of withstanding the high pressure condition. Additionally, testing is routinely performed on the HIPPS to meet or maintain regulatory approval. During testing, the HIPPS may be susceptible to the high pressure conditions discussed above, and failure of the HIPPS may result in undesirable high pressure downstream of the HIPPS.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
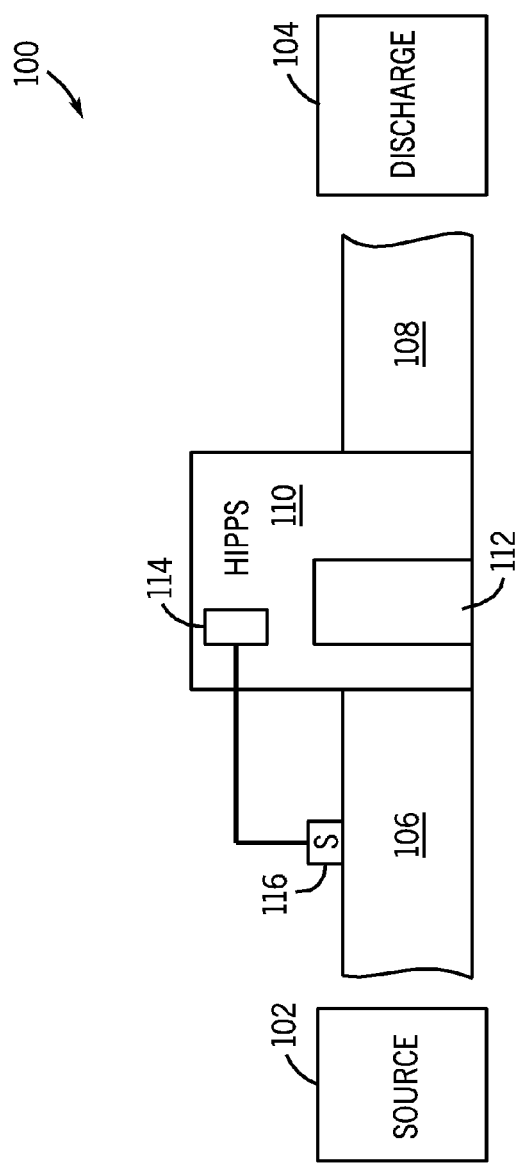
FIG. 1 is a schematic diagram of a pipeline and HIPPS system in accordance with an embodiment of the present invention.

FIG. 1 is a block diagram that illustrates an embodiment of a mineral extraction system 100. The illustrated mineral extraction system 100 can be configured to extract various minerals and natural resources, including hydrocarbons (e.g., oil and/or natural gas), or configured to inject substances into the earth. In some embodiments, the mineral extraction system 100 is land-based (e.g., a surface system) or subsea (e.g., a subsea system). As illustrated, the system 10 includes a source 102, such as a wellhead coupled to a mineral deposit via a well, and a destination 104, such as an additional transportation and/or storage.

The mineral extraction system 100 includes pipes 106 and 108, and a HIPPS 110. The pipe 106 may be referred to as an upstream pipe 106, as it is upstream of the HIPPS 110. Similarly, the pipe 108 may be referred to as a downstream pipe 108, as it is downstream of the HIPPS 110. The HIPPS 110 may include one or more valves 112 and may include an electronic control module 114. The electronic control module 114 may receive signals from one or more sensors 116 located in or on the upstream pipe 106. The sensors 116 may be configured to monitor pressure, temperature, flow rate, or any other parameter of the fluid in the pipe 106. The electronic control module 114 and sensors 116 may be further connected to controls or interfaces (not shown) accessible by an operator from a control station.

During normal operation, an operator may open or close the valves 112 in the HIPPS in response to readings from the sensors 116, or the electronic control module 114 may automatically close or open the one or more valves 112 in the HIPPS 110 in response to signals from the sensors 116. For example, in response to a high pressure condition, the electronic control module 114 may receive a signal from the sensor 116 and close one or more of the valves 112 to prevent the high pressure fluid from moving into the downstream pipe 108 and damaging downstream piping or equipment. The high pressure condition may be any pressure level undesirable in the downstream pipe 108 or other downstream equipment. Such an automatic response system in the HIPPS 110 may be referred to as a Safety Instrumented Function Control System.

The components of the HIPPS 110, such as the valves 112, the electronic control module 114, the sensors 116, and their operation contribute to the SIL rating of the HIPPS. To meet regulatory requirements, the HIPPS 110 may be required to have a specific SIL rating, which may achieved through redundant valves 112, electronic control module 114, or other devices.

The valves 112 in the HIPPS 110 may include hydraulic, electronic, and/or pneumatic actuators to open and close the valves. However, the failure of the sensors 116, the electronic control module 114, or the actuators may result in the valves remaining open during an undesirable high pressure condition. Similarly, the capability of failure of the sensors 116, the electronic control module 114, and/or the actuators may result in lower SIL ratings for the HIPPS 110.

Exemplary embodiments of the present invention provide a gate valve having a secondary actuation mechanism, such as an additional mechanical connection between the actuator and the valve 112, which addresses the problems discussed above. For example, in the event of a failure of the sensors 114, the electronic control module 114, or the actuators of the valves 112 in the HIPPS 110, the secondary actuation mechanism may fail in such a manner so that the valve 112 closes or remains closed. The introduction of a reliable mode of failure, that is mechanical rather than electrical or hydraulic/pneumatic, may increase the SIL rating of such a valve 112 and a HIPPS 110 using the valve 112, thus providing easier compliance with regulatory requirements.

Figure 2:
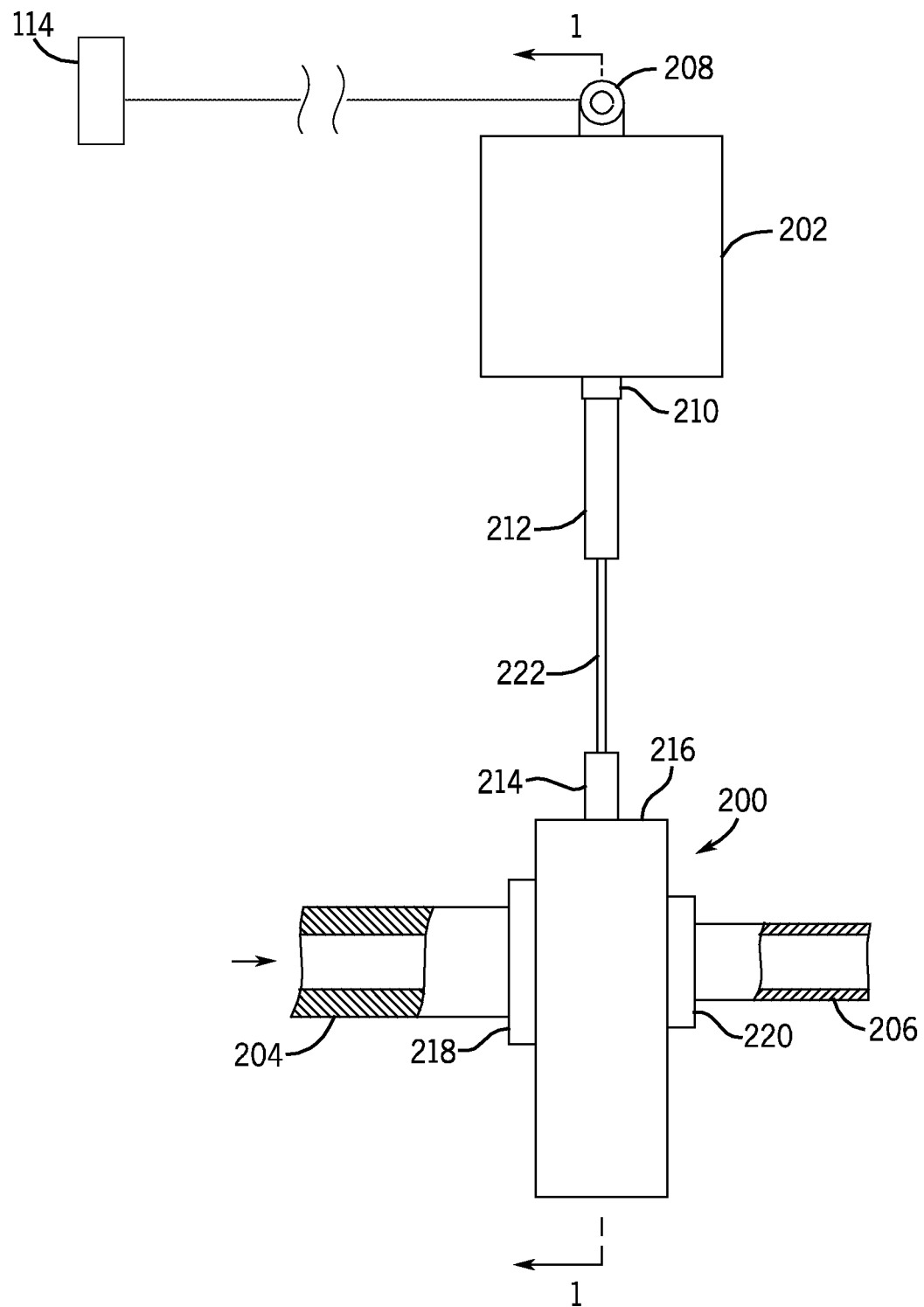
FIG. 2 is a schematic diagram indicating further details of a gate valve in a HIPPS in accordance with an embodiment of the present invention.

FIG. 2 is a schematic view of a dual-acting multi-actuating gate valve 200, such as may be used in a HIPPS as described above, The valve 200 may be controlled by a hydraulic or pneumatic actuator 202, which may be controlled by the electronic control module 114, also described above. As described above, a failure of the electronic control module 114 may result in an ability to control the actuator 202. The valve 200 may be placed between an upstream pipe 204 transporting the mineral from a source and a downstream pipe 206 transporting to further downstream equipment. The upstream pipe 204 is a high pressure pipeline, e.g., thick-walled pipe, and the downstream pipe 206 is a low pressure pipeline, e.g., thin-walled pipe, and the downstream infrastructure and equipment are also be limited to relatively low pressure capabilities. A choke, regulator, or other device maintains the pressure in the upstream piping 204 at acceptable levels. However, if such levels are exceeded, the valve 200 may close to protect the downstream pipe 206 and downstream infrastructure from the high pressure.

In the illustrated embodiment, the actuator 202 includes a top port 208, a bottom port 210, and a piston 212, which cooperate with one another and facilitate operation of the valve 200. The valve 200 includes a gate stem 214 to operate a valve plug inside the valve body 216. Additionally, the valve 200 includes an inlet 218 and an outlet 220, although the inlet and outlet sides of the valve are interchangeable. The valve 200 may be oriented to provide accessibility to the valve 200 for operation and servicing. The inlet 218 and outlet 220 are configured to provide a secure and leak-free seal with the pipes 204 and 206 or other fluid transfer component in the system. As described further below, movement of the actuator 202 moves a gate within the valve body 216 via the gate stem 214, closing or opening the valve 200 based on the position of the actuator 202.

In accordance with an embodiment of the present invention, the valve 200 may include a secondary actuation mechanism 222, e.g., a "buckling pin," mechanically connecting the piston 212 to the stem 214. The buckling pin 222, which may also be referred to as a "rupture pin," provides a secondary and non-electronic/non-hydraulic mechanism to cause the valve 200 to close in the event of a high pressure or overpressure situation in the upstream pipe 204.

In a conventional mode of operation, the valve 200 may be closed in a high pressure condition by the electronic control module 114. The electronic control module 114 may be configured to close the valve 200 at a pressure below a critical pressure that could buckle the buckling pin 222. In the event of a failure of the electronic control module 114, a sensor 116, or any other component within the electronic and/or hydraulic system controlling the valve 200, the buckling pin 222 would buckle, i.e., collapse, severing the connection between the actuator 202 and the valve 200 and thereby preventing the actuator 202 from moving into a position that would open the valve 200. The buckling pin 222 may be designed to collapse at a pressure below the pressure that would potentially damage the downstream pipe 208 or the downstream equipment.

Advantageously, the use of the secondary actuation mechanism 222 does not interfere with normal operation of the valve 200. For example, the valve 200 may by operated by an operator, or may be operated automatically by a Safety Instrumented Function Control System of a HIPPS, without damaging the secondary actuation mechanism 222. Such operation of the valve may provide for partial and full valve closure testing, such as testing necessary to determine or maintain a Safety Integrity Level or other regulatory certification, without damaging or activating the buckling pin. Further, in some embodiments multiple valves 200 may be used, either in a HIPPS or in other configurations. Additionally, as discussed further below, the secondary actuation mechanism 222 provides a secondary reliable mechanism of protection during testing of the valve 200.

Figure 3:
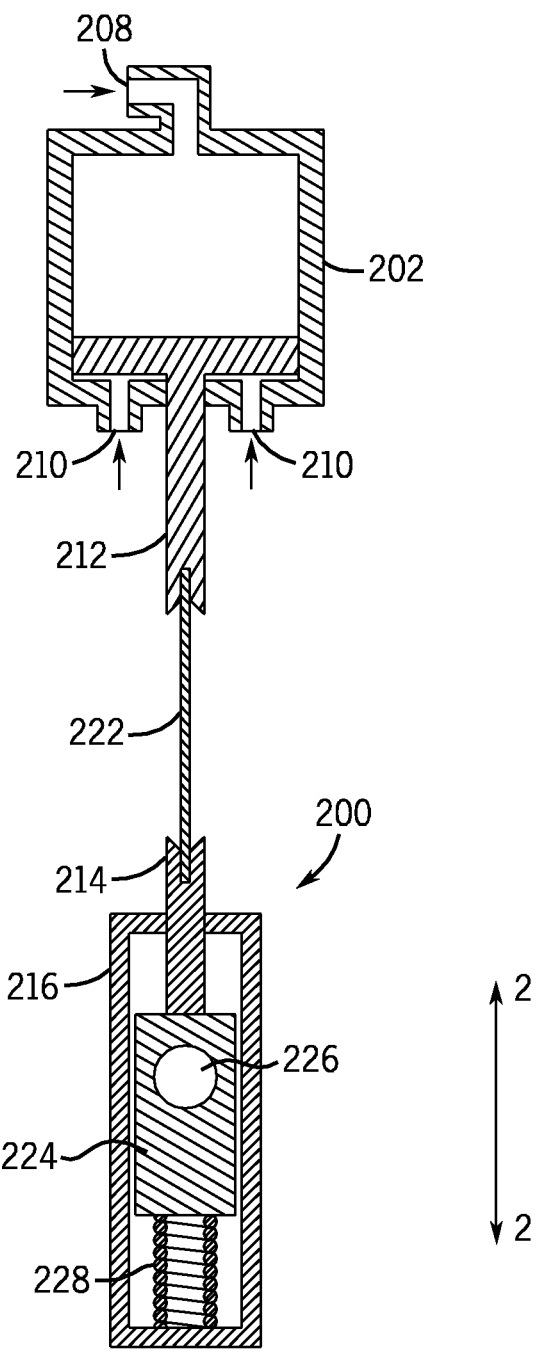
FIG. 3 is a cross-section of the gate valve of FIG. 2 in accordance with an embodiment of the present invention.

FIG. 3 depicts a cross-section of the valve 200 taken along line 1-1 of FIG. 2 and further illustrates interior components of the valve 200. As described above, the valve 200 includes the valve body 216, which may enclose a gate 224 and a port 226. The gate 224 generally moves in the direction indicated by line 2-2 to open and close the valve 200, thus engaging or disengaging the port 226 with the inlet 218 and outlet 220. The illustrated valve 200 also includes a spring 228 configured to bias the gate 224 to a closed position. In other embodiments, the valve 200 may use a Belleville washer to bias the gate 224 to a closed position, or any other suitable biasing mechanism may be used. To open the valve 200, the actuator 202 drives against the internal pressure of the fluid in the valve 200 and the force of the spring 228.

The secondary actuation mechanism 222, e.g., the buckling pin, may be aligned and secured to the ends of the piston 212 and stem 214. For example, the buckling pin 222 may be welded, adhered, fastened, or otherwise secured via any suitable technique or combination thereof to the piston 212 and/or the stem 214. The buckling pin 222 mechanically connects the actuator 202 to the stem 214. As will be appreciated, the valve 200 and actuator 202 may be otherwise physically attached to each other such that the two components are physically restrained from moving relative to each other. As mentioned above, the actuator 202 may include the top port 208 and the two bottom ports 210, used in operation of the actuator as described further below.

Figure 4:
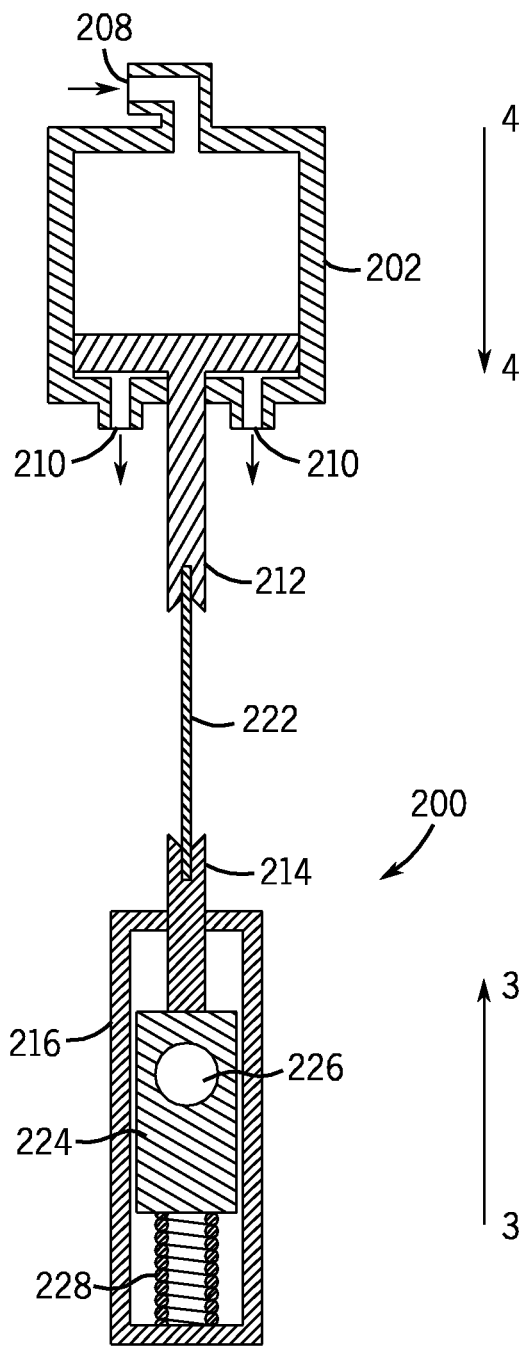
FIG. 4 is a cross-section of the gate valve of FIG. 2 in an open position in accordance with an embodiment of the present invention.

FIG. 4 depicts the valve 200 in an open position, such that fluid may flow through the valve 200 via the port 226 of the gate 224, the inlet 218, and the outlet 220. The valve 200 may remain in the open position during normal operation of a mineral extraction system, and the pressure in the system may be choked, regulated, or otherwise controlled by one or more devices upstream of the valve 200. To maintain the valve 200 in an open position, the gate 224 is held open against the force of the spring 228 and the pressure of the fluid in the valve acting on the area of the stem 214. This force is generally indicated by line 3-3. To move the piston 212 of the actuator 202 to the open position, hydraulic or pneumatic pressure may be applied to the top port 208, moving the piston 212 in the direction indicated by line 4-4. As the piston 212 moves down, the piston 212 drives the secondary actuation mechanism, e.g. buckling pin 222, and gate stem 214 down against the spring 228. The bottom ports 210 may be vented to sea or atmosphere to allow any fluid on that side of the piston 212 to vent.

Figure 5:
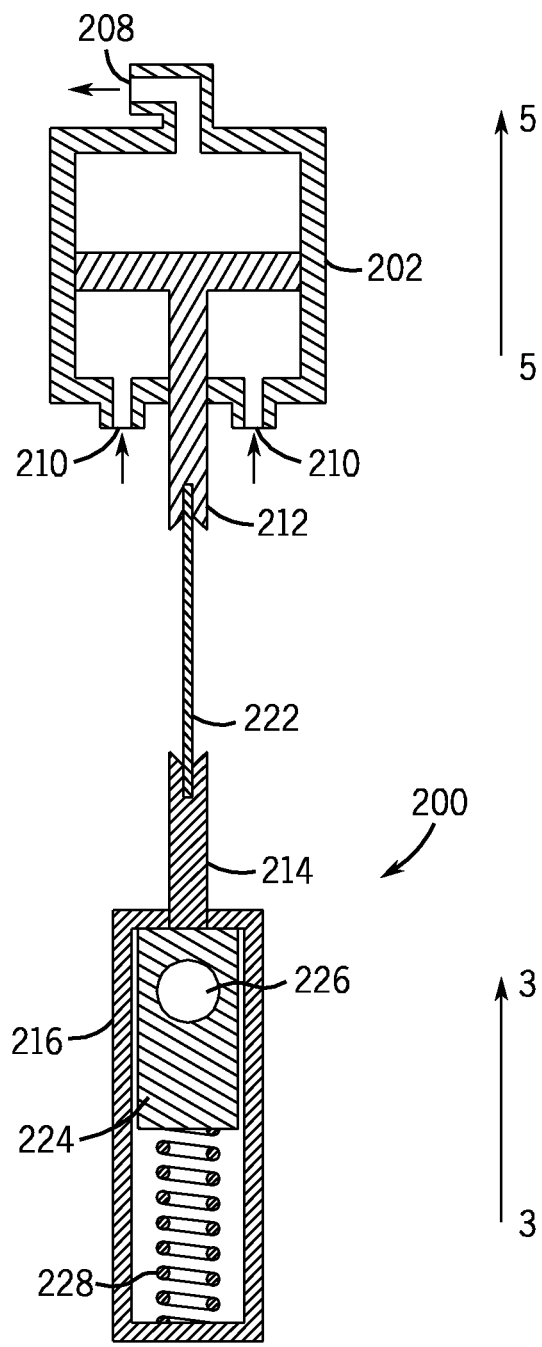
FIG. 5 is a cross-section of the gate valve of FIG. 2 in a closed position in accordance with an embodiment of the present invention.

FIG. 5 depicts the valve 200 in a closed position during normal operation in accordance with an embodiment of the present invention. As described above, the force of the spring 228 and pressure of the fluid flowing through the valve 200 on the area of the gate stem 214 acts in the direction indicated by line 3-3. The valve gate 224 may be held in a closed position by this force, thus moving the port 226 out of alignment with the inlet 218 and outlet 220 and preventing fluid from flowing through the port 226 and the valve 200.

To allow movement of the gate 224 to the closed position, the top port 208 of the actuator 202 may be vented to allow the fluid in the upper portion of the actuator 202 to vent. The piston 212 is free to move up into the actuator 202, as indicated by line 5-5, to a distance determined by the spring 228. The bottom ports 210 are opened to allow fluid to flow into the bottom portion of the actuator 202 as the piston is driven by the spring 228. During this operation and movement of the piston 212, the secondary actuation mechanism 222, e.g., the buckling pin, remains undamaged and operates as a secondary actuation mechanism between the stem 214 and the piston 212.

The closed position described in FIG. 5 may result from an operator closing the valve during normal operation or testing, or may result if the Safety Instrumented Control System of a HIPPS issued a command to close the valve for testing or in response to a high pressure condition.

Figure 6:
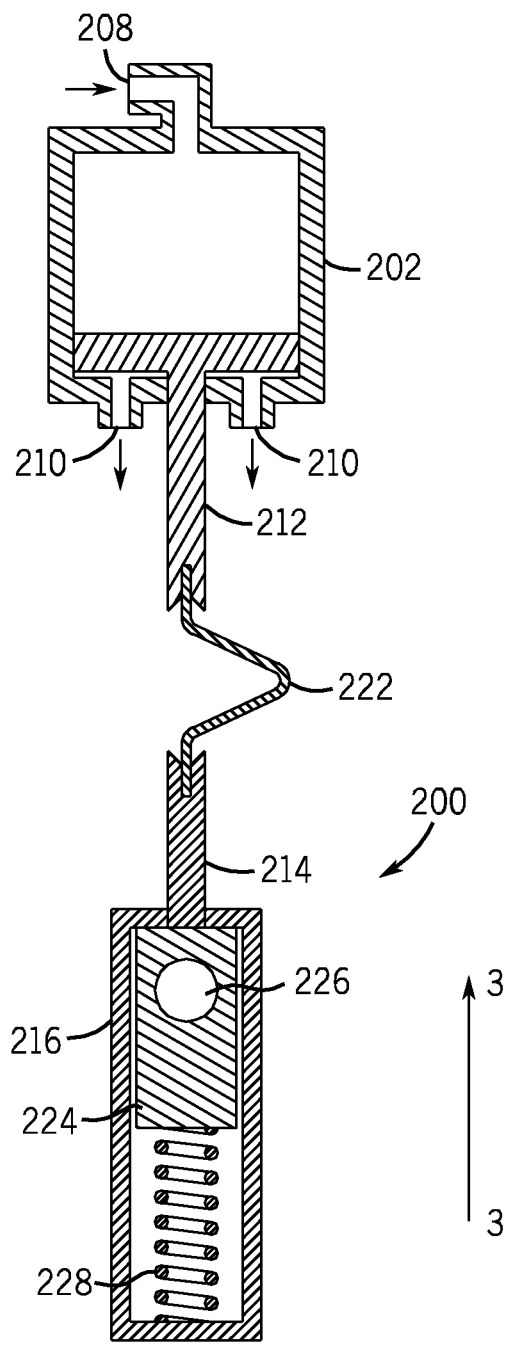
FIG. 6 is a cross-section of the gate valve of FIG. 2 with a buckled pin in accordance with an embodiment of the present invention.

As discussed above, failure of an electronic control module, sensors, and/or other components of a monitoring and control system may result in the valve 200 being held open during a high pressure condition. FIG. 6 depicts activation of the secondary actuation mechanism 222, e.g., the buckling pin, to maintain a closed position of the valve 200 in accordance with an embodiment of the present invention. As depicted in FIG. 6, the actuator 202 and piston 212 are moved into such a position as to open the valve 200, as the top port 208 may receive hydraulic or pneumatic pressure and the bottom ports 210 are vented, as described above. However, the force of the spring 228 and the pressure of the fluid in the valve 200 exert a force in the direction indicated by line 3-3.

In the high pressure condition illustrated in FIG. 6, the pressure of the fluid in the valve 200 is sufficient to fail, e.g., buckle, the secondary actuation mechanism 222, e.g., buckling pin, thus causing the valve gate 224 to move up to the top of the valve body 216 and close the valve. This condition may result if the operator of Safety Instrumented Function Control System of a HIPPS failed to issue a command to close valve 200, or one or more components of the system failed and the valve 200 failed to close. In conventional operation, without the secondary failure mechanism provided by the secondary actuation mechanism 222, the valve 200 remains in the open position, exposing the downstream pipe 206 and downstream equipment to the high pressure of the fluid in the valve 200. However, the collapse of the secondary actuation mechanism 222 of the valve 200 in response to a minimum pressure of the fluid allows the gate 224 to move to the closed position and prevent high pressure fluid flow into the downstream pipe 206 and downstream equipment.

Figure 7:
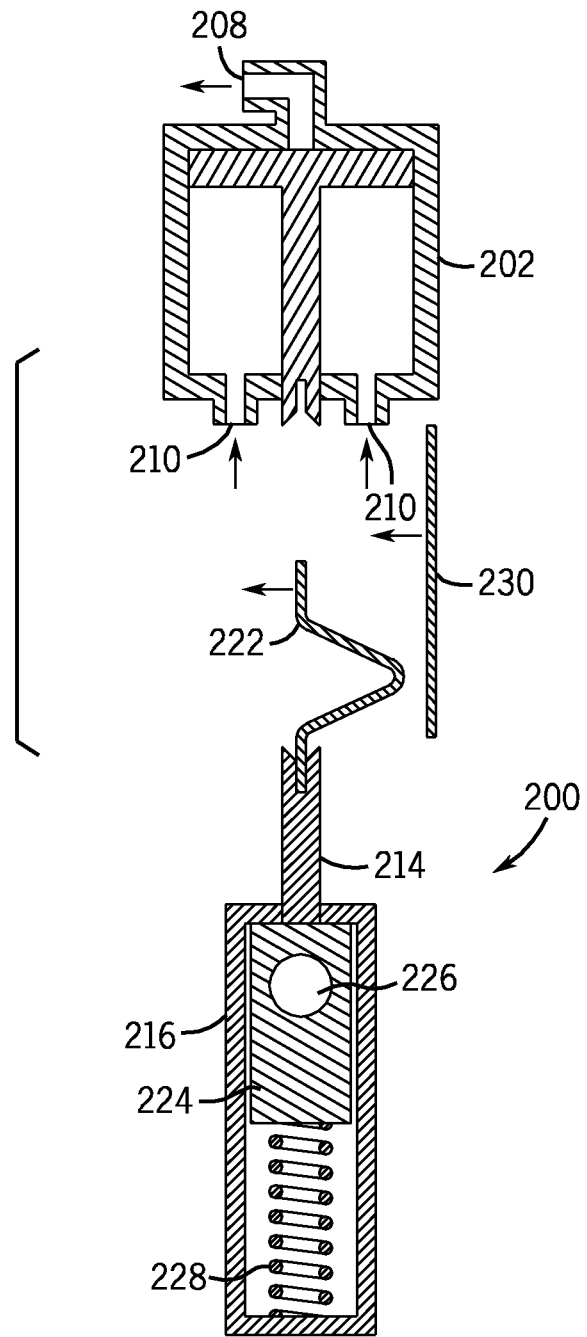
FIG. 7 is a cross-section of the gate valve of FIG. 2 depicting replacement of a buckled pin in accordance with an embodiment of the present invention.

In the event of a collapse of the secondary actuation mechanism 222, the secondary actuation mechanism 222 may need to be replaced. FIG. 7 depicts replacement of the secondary actuation mechanism in accordance with an embodiment of the present invention. To facilitate replacement of the secondary actuation mechanism 222, the piston 212 of the actuator 202 may be driven to the closed or top position, such as by venting the top port 208 and the bottom ports 210. The secondary actuation mechanism 222 may be detached from the bottom of the piston 212. The gate 224 of the valve 200 remains in the closed position due to the force exerted by the spring 228. Because the spring 228 is no longer connected to the piston 212, due to removal of the secondary actuation mechanism 222, the spring 228 no longer needs to overcome the pressure exerted or the piston 212 or the mass of the piston 212. The secondary actuation mechanism 222 may then be removed from the stem 214 of the valve 200. A replacement secondary actuation mechanism 230 may then be installed in the reverse manner. In some environments, such as subsea extraction system and/or a HIPPS, replacement of the secondary actuation mechanism 222, may involve the use of a remotely operated vehicle (ROV) and/or purpose built tooling or equipment.

The valve 200 using the secondary actuation mechanism 222 may be integrated into existing infrastructure. That is, there is no need to replace or redesign the upstream or downstream equipment, as the secondary actuation mechanism may be designed to work with the pressure requirements both upstream and downstream of the valve 200. Further, valves having other moveable components, such as plugs, cones, balls, discs, etc. may be used in the manner described.

In one embodiment, the secondary actuation mechanism 222 may be a buckling pin consisting essentially of steel. In other embodiments other suitable materials may be used. Design of the secondary actuation mechanism 222 may include considerations such as strength, modulus of elasticity, size, length-to-diameter of the connection, and the size and weight of the valve 200. In some embodiments, other secondary actuation mechanisms 222 may be used that provide a suitable mechanical connection between the actuator and the valve 200. For example, other embodiments may use a shear pin or a shaft slide to provide a secondary actuation mechanism that closes the valve in a failure mode.

Figure 8:
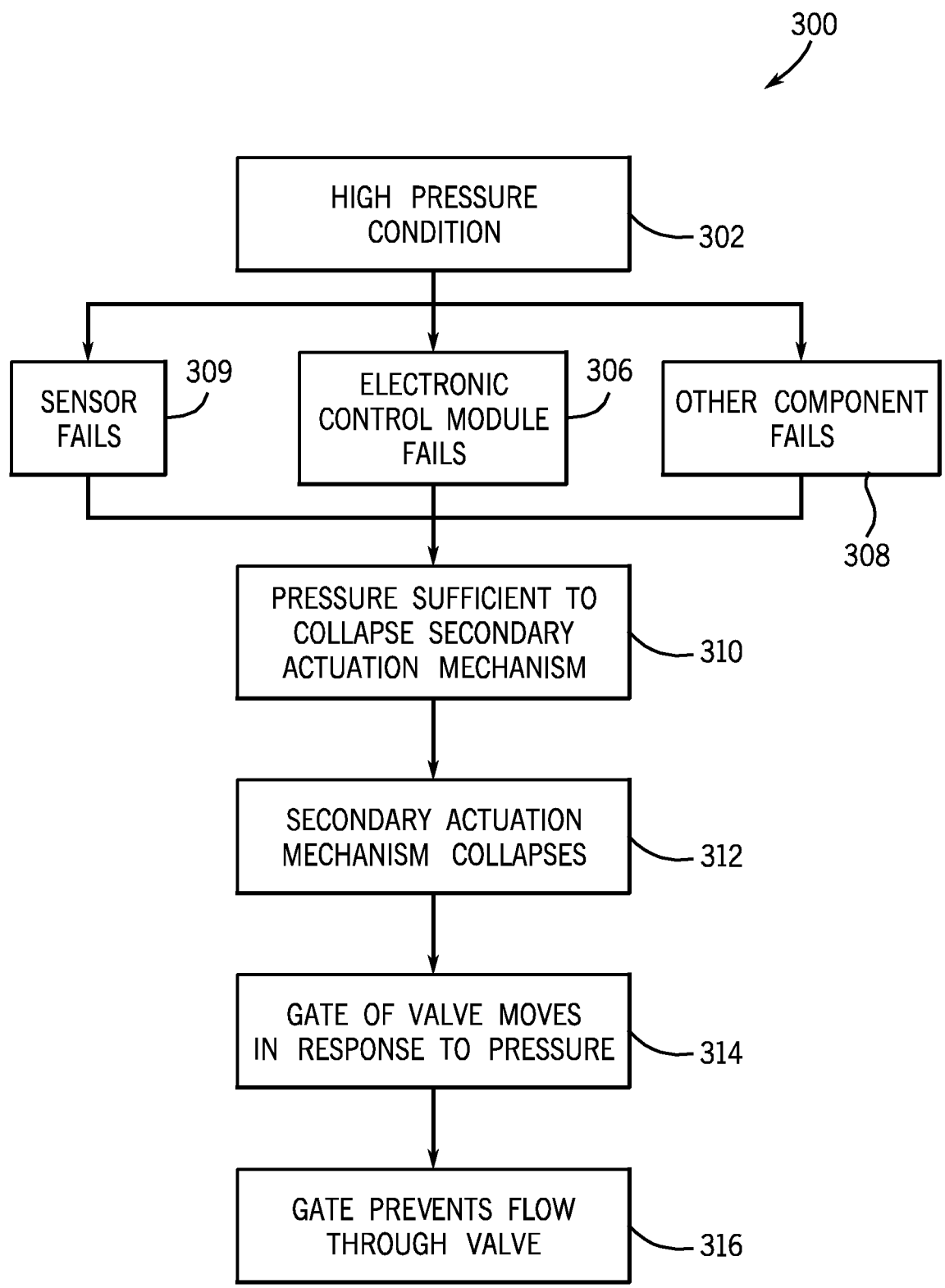
FIG. 8 is a flowchart of the operation of the gate valve of FIG. 2 in accordance with an embodiment of the present invention.

FIG. 8 depicts a process 300 illustrating operation of the valve 200 during a high pressure or overpressure condition in accordance with an embodiment of the present invention. Initially, the high pressure condition occurs (block 302) upstream of the valve 200. In responding to the high pressure event, various failures may occur. A sensor may fail and be unable to detect the high pressure (block 304). An electronic control module coupled to the actuator of the valve 200 may not respond, may not receive a signal from the sensor, or may generally fail (block 306). Finally, other components of the system may fail (block 308) and, thus, fail to close the valve in response to the high pressure condition. If any one or any combination of failures occur, the pressure may continue to rise increasing the severity of the high pressure condition (block 308). Eventually, the pressure reaches a level sufficient to collapse the secondary actuation mechanism 222 (block 310). At this pressure, the secondary actuation mechanism 222 collapses (block 312), such as the buckling of the buckling pin as illustrated above in FIG. 6. As the secondary actuation mechanism 222 collapses, the gate of the valve 200 moves up in response to the force from the spring in the valve 200 and the pressure of the fluid (block 314), causing the gate to move to the closed position and blocking flow through the valve (block 316).

Further, FIG. 8 may also describe operation of the valve 200 during testing. Initially, to simulate a high pressure condition, a high pressure signal may be sent to an electronic control module coupled to the actuator of the valve 200. The high pressure signal is intended to simulate an actual pressure condition that would be detected by one or more sensors in the pipeline or other equipment upstream of the valve 200. As the electronic module receives the high pressure signal, in response the electronic control module may close the valve 200. Because the secondary actuation mechanism 222 allows normal operation of the valve, the secondary actuation mechanism 222 provides a secondary redundant and reliable mechanism of failure in the event of an actual high pressure condition during testing. For example, if the valve 200 does not respond to closing during the test, the valve 200 remains open and allow fluid to flow to the downstream pipeline and equipment. If a high pressure condition occurs, the secondary actuation mechanism 222 may collapse as described above, closing the valve 200 and minimizing any damage to downstream pipeline or other equipment during the test.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A valve, comprising:
   a body;
   a shaft;
   a movable portion disposed within the body and coupled to the shaft, wherein the movable portion is configured to allow fluid flow through the valve when in a first position and to block fluid flow through the valve when in a second position;
   an actuator coupled to the shaft, wherein the actuator is configured to move the movable portion between the first position and the second position;
   a mechanical connection between the actuator and the shaft, wherein the mechanical connection is configured to fail in response to an internal pressure, wherein the failure of the mechanical connection maintains the movable portion in the second position.

2. The valve of claim 1, wherein the mechanical connection comprises a pin configured to buckle in response to a pressure.

3. The valve of claim 1, wherein the mechanical connection comprises a pin configured to shear in response to a pressure.

4. The valve of claim 1, comprising a coil spring configured to assist movement of the movable portion from the first position to the second position.

5. The valve of claim 1, comprising a Belleville washer configured to assist movement of the movable portion from the first position to the second position.

6. The valve of claim 1, wherein the actuator comprises a fluid-driven actuator.

7. The valve of claim 1, wherein the actuator is coupled to an electronic control module configured to activate the actuator.

8. The valve of claim 1, wherein the actuator comprises a piston coupled to the mechanical connection.

9. The valve of claim 1, comprising a mineral extraction system coupled to the valve, wherein the mineral extraction system comprises a well, a wellhead, a subsea tree, a mineral deposit, a tool, a tool connector, a valve, a controller conduit, or a combination thereof.

10. The valve of claim 1, wherein the moveable component comprises a plug, a cone, a disc, a ball, a gate, or any combination thereof.

11. The valve of claim 1, comprising a controller coupled to the actuator, wherein the controller is configured to operate the actuator to move the mechanical connection to cause movement of the movable portion between the first position and the second position.

12. A safety device for a valve, comprising:
   a mechanical connection configured to mount between an actuator and a shaft of the valve, wherein the mechanical connection is configured to fail in response to an internal pressure such that the valve blocks fluid flow through the valve.

13. The device of claim 12, wherein the mechanical connection comprises a buckling pin.

14. The device of claim 12, wherein the mechanical connection comprises a shear pin.

15. The device of claim 12, wherein the mechanical connection is configured to mount to a piston of the actuator.

16. The device of claim 12, wherein the mechanical connection is configured to move without failure to move the valve in response to a force applied by the actuator based on input from a controller.

17. The device of claim 16, comprising the actuator and the controller, wherein the controller is configured to operate the actuator in response to feedback from at least one sensor.

18. A method of operation of a valve, comprising:
controlling an actuator to move a mechanical connection to cause movement of the valve between first and second positions; and
moving the valve between the first and second positions by severing the mechanical connection between the actuator and the valve in response to an internal pressure.

19. The method of claim 18, wherein the severing comprises buckling the mechanical connection.

20. The method of claim 18, wherein the severing comprises shearing the mechanical connection.

21. The method of claim 18, wherein controlling the actuator comprises receiving feedback from at least one sensor at a controller, outputting a control from the controller to the actuator based on the feedback, and providing a force from the actuator to the mechanical connection to move the valve based on the control, wherein moving the valve between the first and second positions by severing the mechanical connection comprises mechanically failing the mechanical connection automatically in response to the pressure exceeding a threshold.

22. A method of testing a valve, comprising:
applying a signal to an actuator drivingly coupled to a valve via a mechanical connection, wherein the valve is configured to block fluid flow through the valve via the failure of a mechanical connection in response to an internal pressure.

23. The method of claim 22, wherein the mechanical connection comprises a buckling pin.

24. The method of claim 23, comprising determining a level of safety of the valve based on predefined criteria.

25. The method of claim 22, wherein the actuator is configured to move the mechanical connection without failure to cause movement of the valve in response to the signal, wherein the valve is configured to block fluid flow through the valve via the failure of the mechanical connection in response to the internal pressure reaching a threshold.

26. A system, comprising:
a valve comprising a movable portion disposed in a body; and
a buckling pin coupled to the movable portion and located between the movable portion and an actuator, wherein the buckling pin is responsive to the actuator to move the movable portion between a first valve position and a second valve position, wherein the buckling pin is configured to selectively fail to a permanently bent configuration that positions the movable portion in the second valve position.

27. The system of claim 26, comprising a stem disposed between the movable portion and the buckling pin, wherein the buckling pin is removably coupled to the stem.

28. The system of claim 27, wherein the buckling pin has a smaller width than the stem.

29. The system of claim 27, wherein the buckling pin is disposed in an opening in the stem.

30. The system of claim 26, wherein the first valve position is an open valve position, and the second valve position is a closed valve position.

31. The system of claim 26, wherein the buckling pin is configured to selectively fail to the permanently bent configuration in response to an internal pressure.

* * * * *